United States Patent [19]

Okanoue et al.

[11] Patent Number: 5,479,450
[45] Date of Patent: Dec. 26, 1995

[54] DIGITAL DATA DEMODULATING APPARATUS

[75] Inventors: Kazuhiro Okanoue; Akihisa Ushirokawa, both of Tokyo, Japan

[73] Assignee: NEC Corporation, Tokyo, Japan

[21] Appl. No.: 172,256

[22] Filed: Dec. 23, 1993

[30] Foreign Application Priority Data

Dec. 25, 1992 [JP] Japan .................................. 4-347221

[51] Int. Cl.$^6$ .............................. H03D 1/00; H04L 27/06
[52] U.S. Cl. ......................................... 375/340; 375/349
[58] Field of Search .................................. 455/133, 134, 455/135, 296, 303, 277.1, 277.2; 375/340, 341, 324, 328, 346, 348, 349

[56] References Cited

U.S. PATENT DOCUMENTS

| 5,127,025 | 6/1992 | Okanoue . | |
|---|---|---|---|
| 5,263,033 | 11/1993 | Seshadri | 371/43 |
| 5,272,727 | 12/1993 | Okanoue | 375/94 |

FOREIGN PATENT DOCUMENTS

| 0448069 | 9/1991 | European Pat. Off. . |
| 0544315 | 6/1993 | European Pat. Off. . |
| 0550143 | 7/1993 | European Pat. Off. . |
| 0582346 | 2/1994 | European Pat. Off. . |

OTHER PUBLICATIONS

IEEE Transactions on Informatioin Theory, vol. 37, No. 6, Nov. 1991, pp. 1649–1657, C. N. Georghiades/M. Moeneclaey, "Sequence Estimation and Synchronization from Nonsynchronized Samples".

Giovanna D'aria, Roberto Piermanrini, and Valerio Zingarelli, "Fast Adaptive Equalizer for Narrow–Band TDMA Mobile Radio", IEEE, Transaction on Vehicular Technology, vol. 40, No. 2, May, 1991).

J. G. Proakis, "Digital Communications", McGraw–Hill, 1983, pp. 394–412.

*Primary Examiner*—Stephen Chin
*Assistant Examiner*—Hai H. Phan
*Attorney, Agent, or Firm*—Sughrue, Mion, Zinn, Macpeak & Seas

[57] ABSTRACT

In a digital data demodulating apparatus, a sampling circuit samples a received signal at a speed N×K (N>1, K>1; integers) times a symbol rate to output received signal sequences. N received signal sequence selection circuits estimate channel impulse responses from the respective received signal sequences to obtain channel state data, and output a control pulse and the estimated channel impulse response values. A received signal sequence selection controller outputs a switch control signal on the basis of the channel state data. N selectors select demodulation received signal sequence candidates from the received signal sequences on the basis of the control pulse. A first switch selects/outputs a received signal sequence to be demodulated on the basis of the switch control signal. A second switch selects/outputs an estimated channel impulse response value estimated from the received signal sequence to be demodulated on the basis of the switch control pulse. A demodulation circuit performs demodulation upon reception of the outputs from the first and second switches.

14 Claims, 9 Drawing Sheets

1

DIGITAL DATA DEMODULATING APPARATUS

BACKGROUND OF THE INVENTION

The present invention relates to a digital data demodulating apparatus and, more particularly, to a digital data demodulating apparatus for obtaining a correct sampling timing from a received signal distorted by inter-symbol interference.

As a conventional digital data demodulating apparatus of this type, a demodulating apparatus designed to estimate a channel impulse response from a received signal sequence sampled at a speed twice a symbol speed, and demodulate a sampling phase, which provides the maximum value of power of the estimated channel impulse response value, as a correct sampling phase is known (e.g., Giovanna D'aria, Roberto Piermanrini, and Valerio Zingarelli, "Fast Adaptive Equalizer for Narrow-Band TDMA Mobile Radio", IEEE, Transaction on Vehicular Technology, Vol. 40, No. 2, May, 1991).

A conventional digital data demodulating apparatus will be described below with reference to the accompanying drawings.

FIG. 7 shows a conventional digital data demodulating apparatus.

Referring to FIG. 7, this conventional digital data demodulating apparatus comprises an input terminal 700, a sampling circuit 701 having a sampling speed twice a symbol speed, impulse response estimators 702 and 703, power calculating circuits 704 and 705, a comparator 706, switches (SWs) 707 and 708, an equalization circuit 709, and an output terminal 710.

A received signal sampled by the sampling circuit 701 at a speed twice the symbol speed is regarded as sequences sampled at the same speeds as the symbol speeds of two sequences, and is sent to the impulse response estimators 702 and 703 and the switch (SW) 707. The impulse response estimators 702 and 703 estimate channel impulse responses corresponding to the respective sequences. Upon reception of the outputs from the impulse response estimators 702 and 703, the power calculating circuits 704 and 705 calculate the powers of the estimated channel impulse responses, respectively. The comparator 706 compares the signals from the power calculating circuits 705 and 706 and outputs the comparison result to control the switches (SWs) 707 and 708 so as to demodulate one of the sequences which corresponds to the communication impulse response having a higher power. Upon reception of the outputs from the switches (SWs) 707 and 708, the equalization circuit 709 demodulates the sequence sampled at the symbol speed obtained from the switch (SW) 707 on the basis of the channel impulse response obtained from the switch (SW) 708. Note that the switch 708 receives the outputs from the impulse response estimators 702 and 703 as inputs.

In this conventional digital data demodulating apparatus, when an actual channel impulse response is shorter than a predetermined length, no deterioration in reception characteristics occurs. If, however, the impulse response length is larger than the predetermined length, a deterioration in reception characteristics occurs because no consideration can be given to a residual inter-symbol interference component exceeding the predetermined length.

SUMMARY OF THE INVENTION

It is an object of the present invention to provide a digital data demodulating apparatus which can prevent reception characteristics from being deteriorated by residual inter-symbol interference.

In order to achieve the above object, according to the present invention, there is provided a digital data demodulating apparatus comprising a sampling circuit for sampling a received signal at a speed N×K (N>1, K>1; even natural numbers) times a symbol rate, classifying combinations of sequences having symbol intervals sampled at K different sample timings into N combinations, and outputting received signal sequences sampled at the same speeds as N×K symbol speeds, N received signal sequence selection circuits for receiving received signal sequences, of a plurality of received signal sequences output from the sampling circuit, which are sampled at the K different timings, estimating channel impulse responses from the respective received signal sequences, obtaining and outputting channel state data on the basis of the respective estimated channel impulse response values, and outputting a control pulse for controlling selection of demodulation received signal sequence candidates from the received signal sequences sampled at the K different timings on the basis of the respective estimated channel impulse response values, and the estimated channel impulse response values estimated from the demodulation received signal sequence candidates, a received signal sequence selection controller for receiving the channel state data respectively output from the N received signal sequence selection circuits, and outputting a switch control signal for selecting a received signal sequence to be demodulated on the basis of the channel state data, N selectors for receiving the control pulse and the plurality of received signal sequences sampled at the N difference timings, selecting demodulation received signal sequence candidates from the plurality of received signal sequences, sampled at the K different timings, on the basis of the control pulse, and outputting the selected candidates, a first switch for receiving the outputs from the N selectors and the switch control pulse, and selecting and outputting the received signal sequence to be demodulated from the outputs from the N selectors on the basis of the switch control pulse, a second switch for receiving the switch control pulse and the estimated channel impulse response values estimated from the demodulation received signal sequence candidates output from the N received signal sequence selection circuits, and selecting and outputting an estimated channel impulse response value, estimated from the received signal sequence to be demodulated, from the estimated channel impulse response values estimated from the demodulation received signal sequence candidates, on the basis of the switch control pulse, and a demodulation circuit for performing demodulation upon reception of the outputs from the first and second switches.

DESCRIPTION OF THE PREFERRED EMBODIMENTS

The present invention will be described below with reference to the accompanying drawings.

Figure 1:
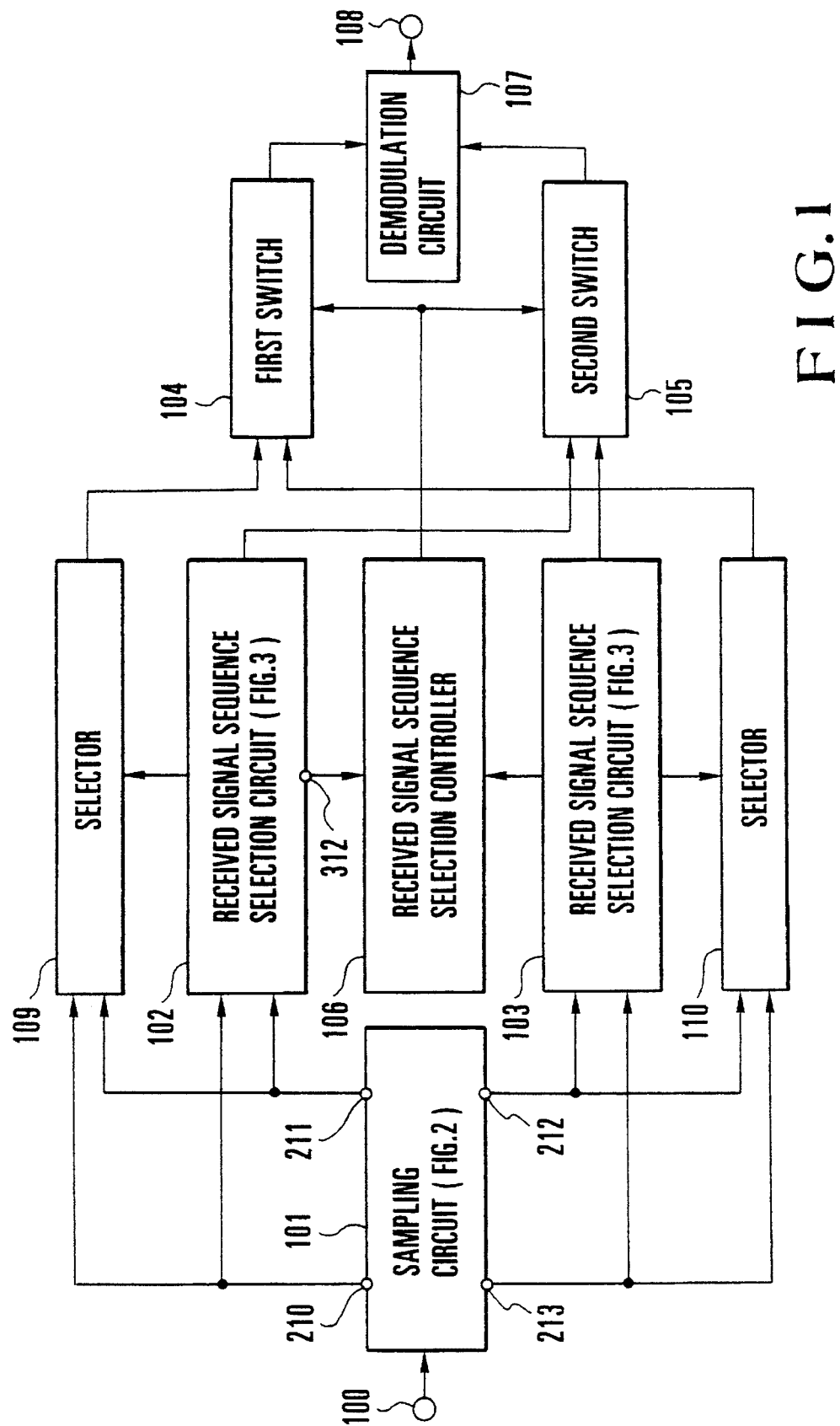
FIG. 1 is a block diagram showing the first embodiment of the present invention.
Figure 2:
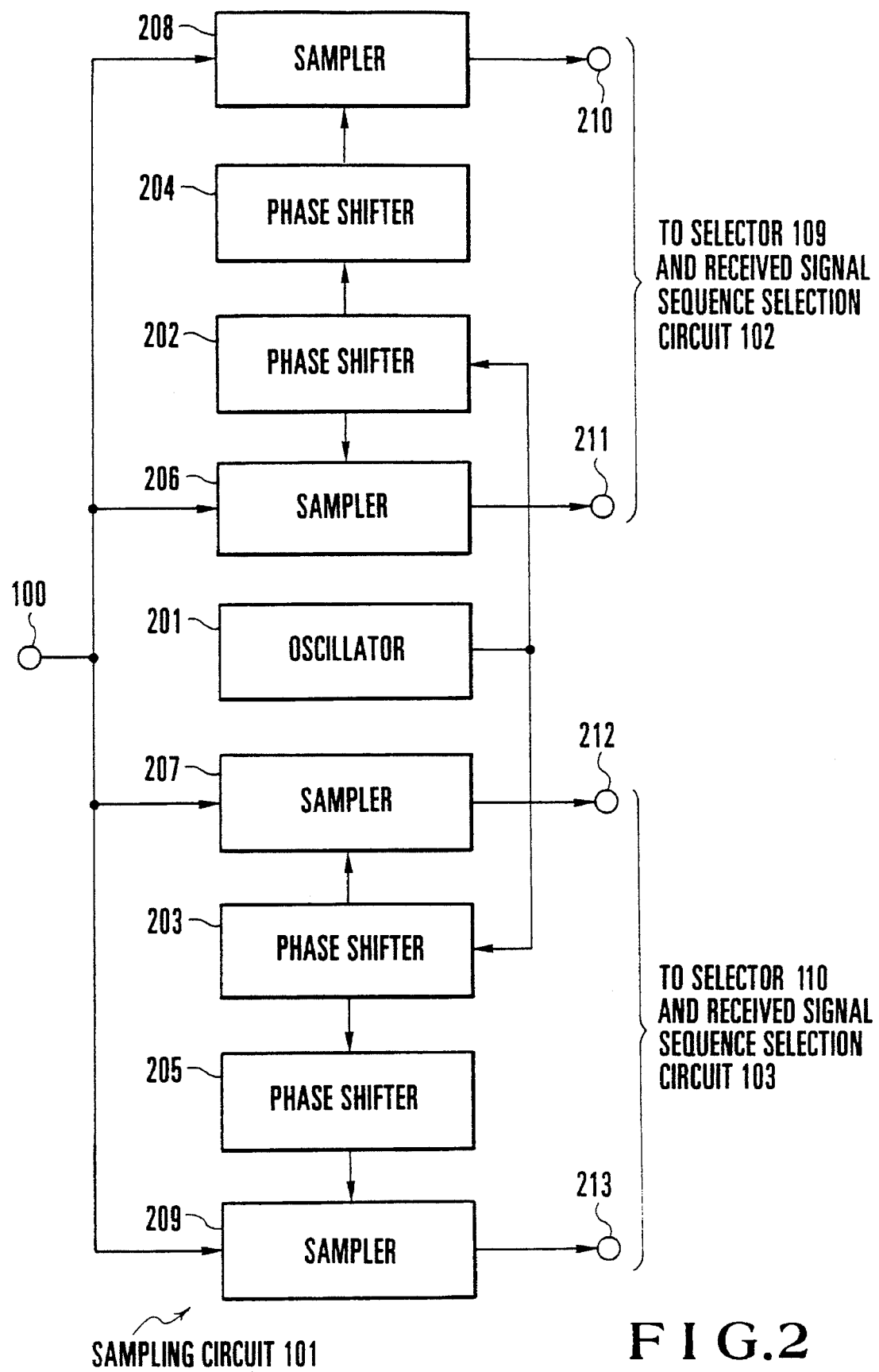
FIG. 2 is a block diagram showing a sampling circuit in the first embodiment.
Figure 3:
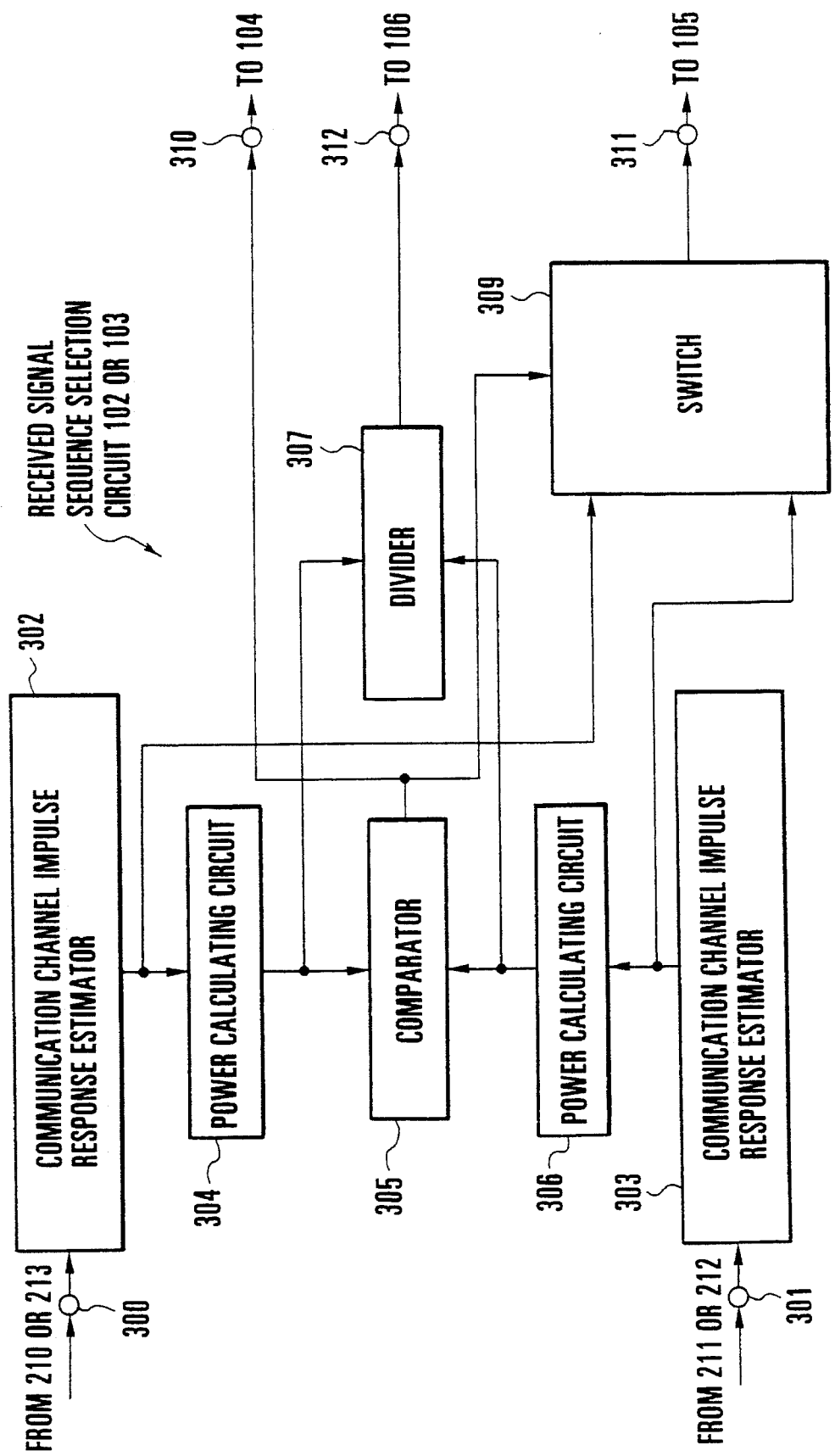
FIG. 3 is a block diagram showing a received signal sequence selection circuit in the first embodiment.

FIG. 1 shows the first embodiment of the present invention. FIG. 2 shows a sampling circuit in the first embodiment. FIG. 3 shows a received signal sequence selection circuit in the first embodiment.

Referring to FIG. 1, a digital data demodulating apparatus of the first embodiment comprises a sampling circuit 101, N (=2) received signal sequence selection circuits 102 and 103, a received signal sequence selection controller 106, selectors 109 and 110, a first switch 104, a second switch 105, and a demodulation circuit 107.

The sampling circuit 101 samples a received signal at a speed N×K (N=2; K=2) times a symbol rate, classifies combinations of sequences having symbol intervals sampled at K (=2) different sampling timings into N (=2) combinations, and outputs received signal sequences sampled at the same speeds as 2×2 symbol speeds.

The received signal sequence selection circuits 102 and 103 receive received signal sequences, of a plurality of received signal sequences output from the sampling circuit 101, which are sampled at K (=2) different timings, and estimate channel impulse responses from the respective received signal sequences. The circuits 102 and 103 obtain and output channel state data on the basis of the respective estimated channel impulse response values. In addition, the circuits 102 and 103 respectively output control pulses for controlling selection of demodulation received signal sequence candidates from the received signal sequences sampled at the two different timings on the basis of the respective estimated channel impulse response values, and also output the estimated channel impulse response values estimated from the demodulation received signal sequence candidates.

The received signal sequence selection controller 106 receives the channel state data respectively output from the received signal sequence selection circuits 102 and 103, and outputs a switch control signal (pulse) for selecting a received signal sequence to be demodulated on the basis of the channel state data.

The selectors 109 and 110 receive the plurality of received signal sequences sampled at the two difference timings and the control pulses, and select and output demodulation received signal sequence candidates from the plurality of received signal sequences, sampled at the K (=2) different timings, on the basis of the control pulses.

The first switch 104 receives the outputs from the selectors 109 and 110 and the switch control pulses from the received signal sequence selection controller 106, and selects and outputs a received signal sequence to be demodulated from the outputs from the selectors 109 and 110 on the basis of the switch control pulses.

The second switch 105 receives the switch control pulses and the estimated channel impulse response values estimated from the demodulation received signal sequence candidates output from the received signal sequence selection circuits 102 and 103, and selects and outputs the estimated channel impulse response value, estimated from the received signal sequence to be demodulated, from the estimated channel impulse response values estimated from the demodulation received signal sequence candidates, on the basis of the switch control pulses.

The demodulation circuit 107 performs demodulation upon reception of the outputs from the first and second switches 104 and 105.

Referring to FIG. 2, in the first embodiment, the sampling circuit 101 is constituted by an oscillator 201, phase shifters 202, 203, 204, and 205, and samplers 206, 207, 208, and 209.

The oscillator 201 generates a clock pulse having the same speed as the symbol rate.

The phase shifters 202 and 203 receive the clock pulse and output N (=2) sample pulses 1 having different phases by changing the phase of each clock pulse.

The phase shifters 204 and 205 respectively shift the phases of the outputs from the phase shifters 202 and 203 by π to output N (=2) sample pulses 2.

The samplers 206 and 207 receive the sample pulses 1 and sample the received signals at the respective timings.

The samplers 208 and 209 receive the sample pulses 2 and sample the received signals at the respective timings.

Referring to FIG. 3, each of the received signal sequence selection circuits 102 and 103 in the first embodiment comprises channel impulse response estimators 302 and 303, power calculating circuits 304 and 306, a comparator 305, a divider 307, and a switch 309.

The channel impulse response estimators 302 and 303 respectively estimate channel impulse responses from received signal sequences sampled, with a phase φ, at the symbol rate intervals and received signal sequences sampled, with a phase φ+π, at the symbol rate intervals, and output the respective estimated channel impulse response values.

The power calculating circuits 304 and 306 receive the estimated channel impulse response values output from the channel impulse response estimators 302 and 303, and calculate the powers of the channel impulse responses.

The comparator 305 receives the outputs from the power calculating circuits 304 and 306 and selects the maximum input value to output a control pulse.

The divider 307 receives the outputs from the power calculating circuits 304 and 306 to obtain the ratio between the input signals, and outputs it as channel state data.

The switch 309 receives the estimated channel impulse response values output from the channel impulse response estimators 302 and 303, and selects and outputs an input signal on the basis of the control pulse.

The operation of the first embodiment will be described next with reference to FIGS. 1, 2, and 3.

A received signal input through an input terminal 100 is input to the sampling circuit 101 and is sampled with four different sample phases.

In the sampling circuit 101 shown in FIG. 2, the oscillator 201 generates a clock pulse at the same frequency as that of the symbol rate. The clock pulse is input to the phase shifters 202 and 203. The phase shifters 202 and 203 shift the clock pulse phase by, e.g., 0 [rad] and π/2 [rad], respectively, and output the resultant pulses to the phase shifters 204 and 205. The phase shifters 204 and 205 further shift the input clock pulses by π, and output the resultant pulses to the samplers 208 and 209.

The samplers 206 to 209 respectively sample the received signal in accordance with the pulses supplied from the phase shifters 202 to 205, and output the sampled signals to output terminals 210 to 213. The output terminals 210 and 211 are connected to the received signal sequence selection circuit 102. The output terminals 212 and 213 are connected to the received signal sequence selection circuit 103.

The received signal sequences sampled with the different sample phases are input to the received signal sequence selection circuits 102 and 103. With the sampling circuit 101 shown in FIG. 2, provided that the initial phase is represented by $\phi$, received signal sequences respectively sampled with phase shifts of $\phi$ [rad] and $\phi+\pi$ [rad] are input to the received signal sequence selection circuit 102, and received signal sequences respectively sampled with phase shifts of $\phi+\pi/2$ [rad] and $\phi+\pi/2+\pi$ [rad] are input to the received signal sequence selection circuit 103.

In the received signal sequence selection circuits 102 and 103 shown in FIG. 3, signals input through input terminals 300 and 301 are supplied to the channel impulse response estimators 302 and 303. If a preamble sequence having an autocorrelation function in an impulse state is used, each of the channel impulse response estimators 302 and 303 can be constituted by a circuit for calculating the correlation between a received signal and a preamble sequence, as described in, e.g., U.S. Pat. No. 5,127,025.

The estimated channel impulse response values estimated by the channel impulse response estimators 302 and 303 are respectively supplied to the power calculating circuits 304 and 306. The power calculating circuits 304 and 306 calculate the powers of the estimated channel impulse response values and output them to the comparator 305 and the divider 307. The comparator 305 compares the input powers of the estimated channel impulse response values, and performs signal selection as follows.

1) If the value input from the power calculating circuit 304 is larger than that input from the power calculating circuit 306, the comparator 305 selects the signal from the input terminal 300 and the signal from the channel impulse response estimator 302.

2) If the value input from the power calculating circuit 306 is larger than that input from the power calculating circuit 304, the comparator 305 selects the signal from the input terminal 301 and the signal from the channel impulse response estimator 303.

Subsequently, the comparator 305 outputs a control pulse to the switch 309 and an output terminal 310. The estimated channel impulse response value selected by the switch 309 is output to an output terminal 311. The divider 307 calculates A/B where A is a larger one of the values input from the power calculating circuits 304 and 306, and B is the smaller value. The divider 307 outputs the calculated value as channel state data to an output terminal 312. In this case, the value B is a residual inter-symbol interference component with respect to the value A. Therefore, the larger the value of the channel state data is, the smaller the residual inter-symbol interference component is. In addition, the power of the estimated channel impulse response value output from the switch 309 is large.

The control pulses input to the output terminals 310 of the received signal sequence selection circuits 102 and 103 are input to the selectors 109 and 110. The selectors 109 and 110 select received signal sequences corresponding to estimated channel impulse response values having large powers in accordance with the control pulses. The channel state data respectively obtained by the received signal sequence selection circuits 102 and 103 are input to the received signal sequence selection controller 106.

In the first embodiment, larger channel state data indicates smaller residual inter-symbol interference. Therefore, the received signal sequence selection controller 106 selects one of the channel state data, respectively obtained from the received signal sequence selection circuits 102 and 103, which has a larger value, and controls the switches 104 and 105 to output, to the demodulation circuit 107, the signal from the selector connected to the selected received signal sequence selection circuit and the estimated channel impulse response value obtained from the selected received signal sequence selection circuit.

The demodulation circuit 107 demodulates the signal by using the received signal sequences respectively input from the switches 104 and 105 and the estimated channel impulse response value, and outputs the demodulation result to an output terminal 108. For example, the demodulation circuit 107 can be realized by using a maximum likelihood estimator disclosed in J. G. Proakis, "Digital Communications", McGraw-Hill, 1983, pp. 394–412.

Figure 4:
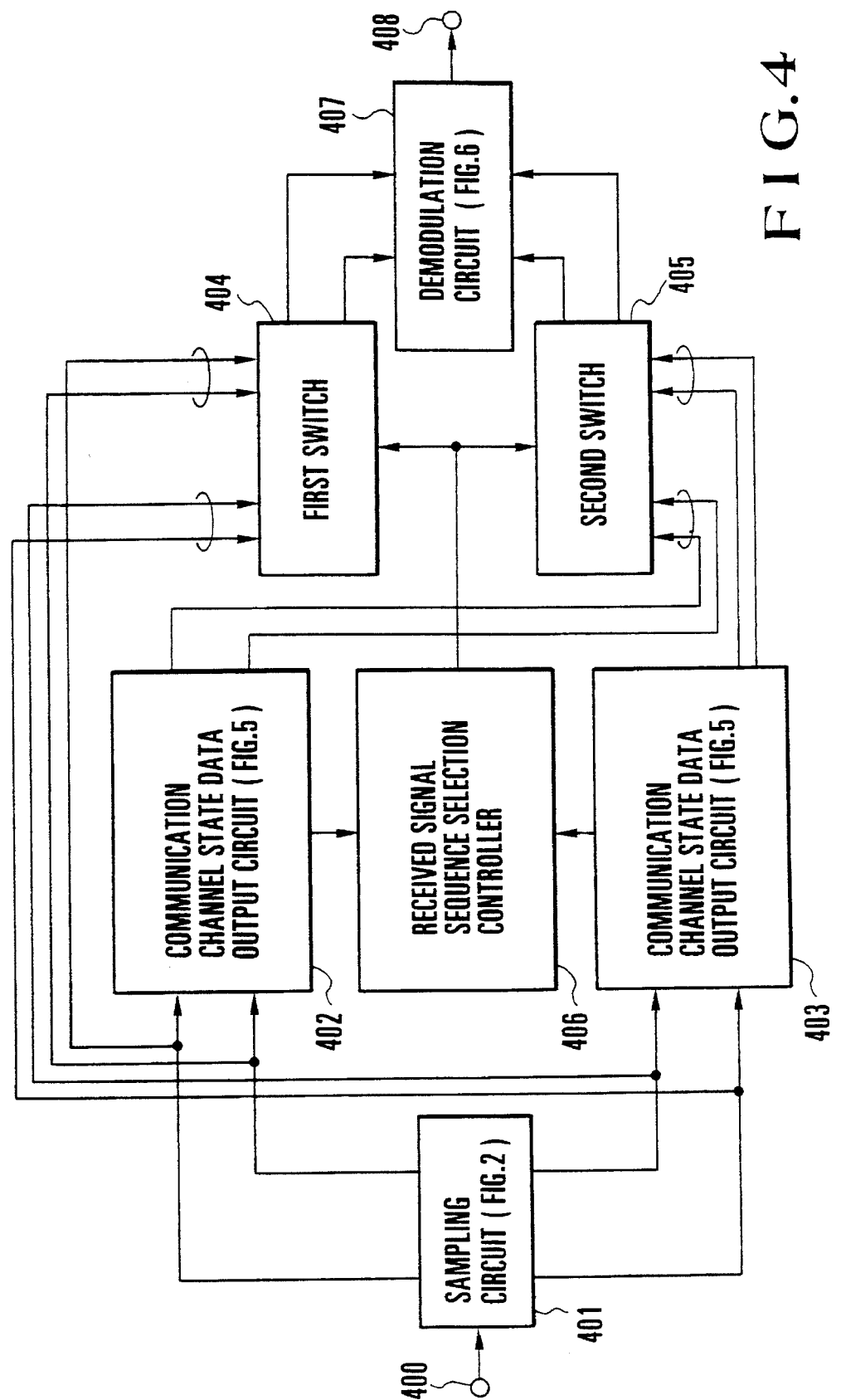
FIG. 4 is a block diagram showing the second embodiment of the present invention.
Figure 5:
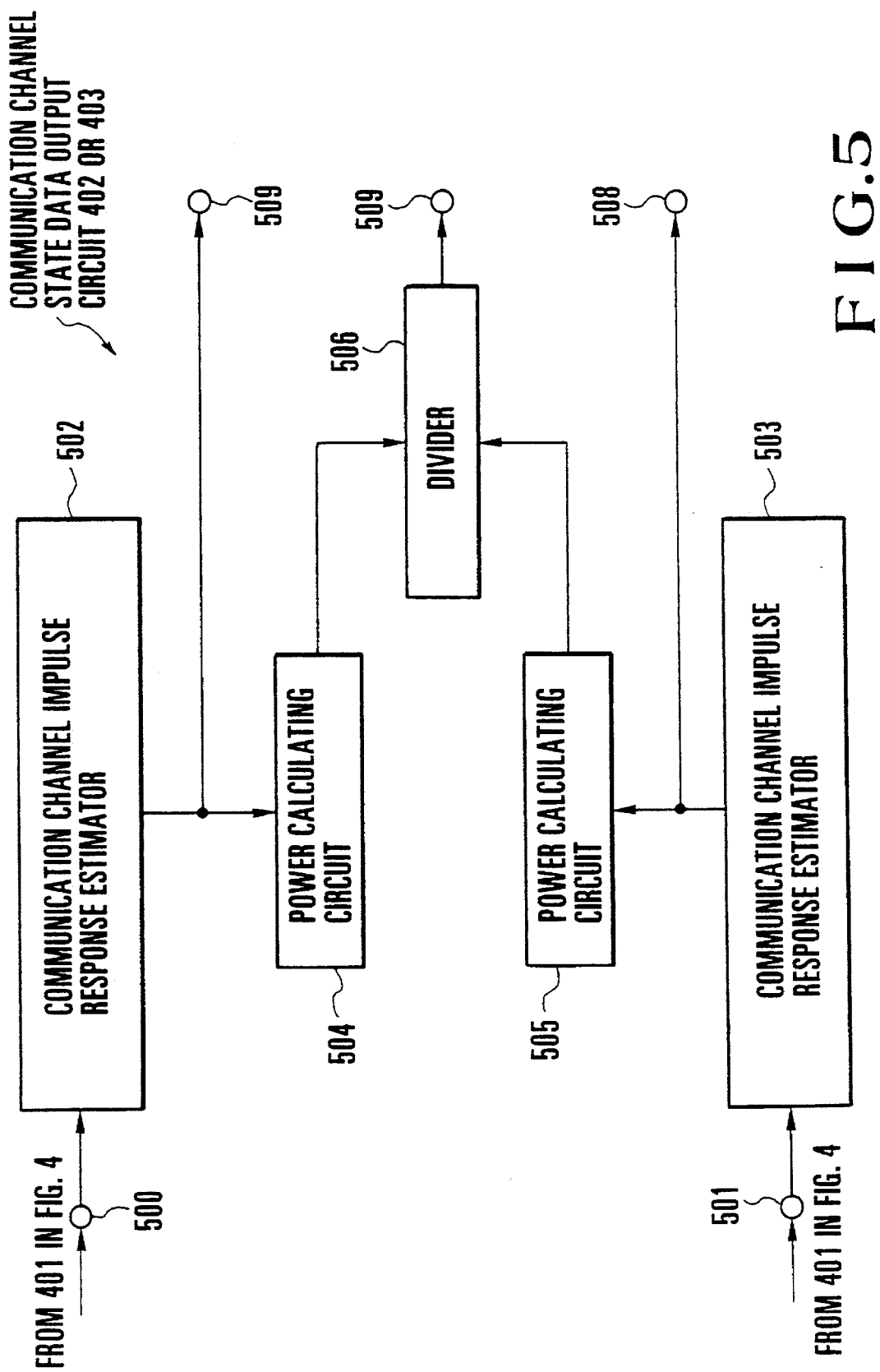
FIG. 5 is a block diagram showing a channel state data output circuit in the second embodiment.
Figure 6:
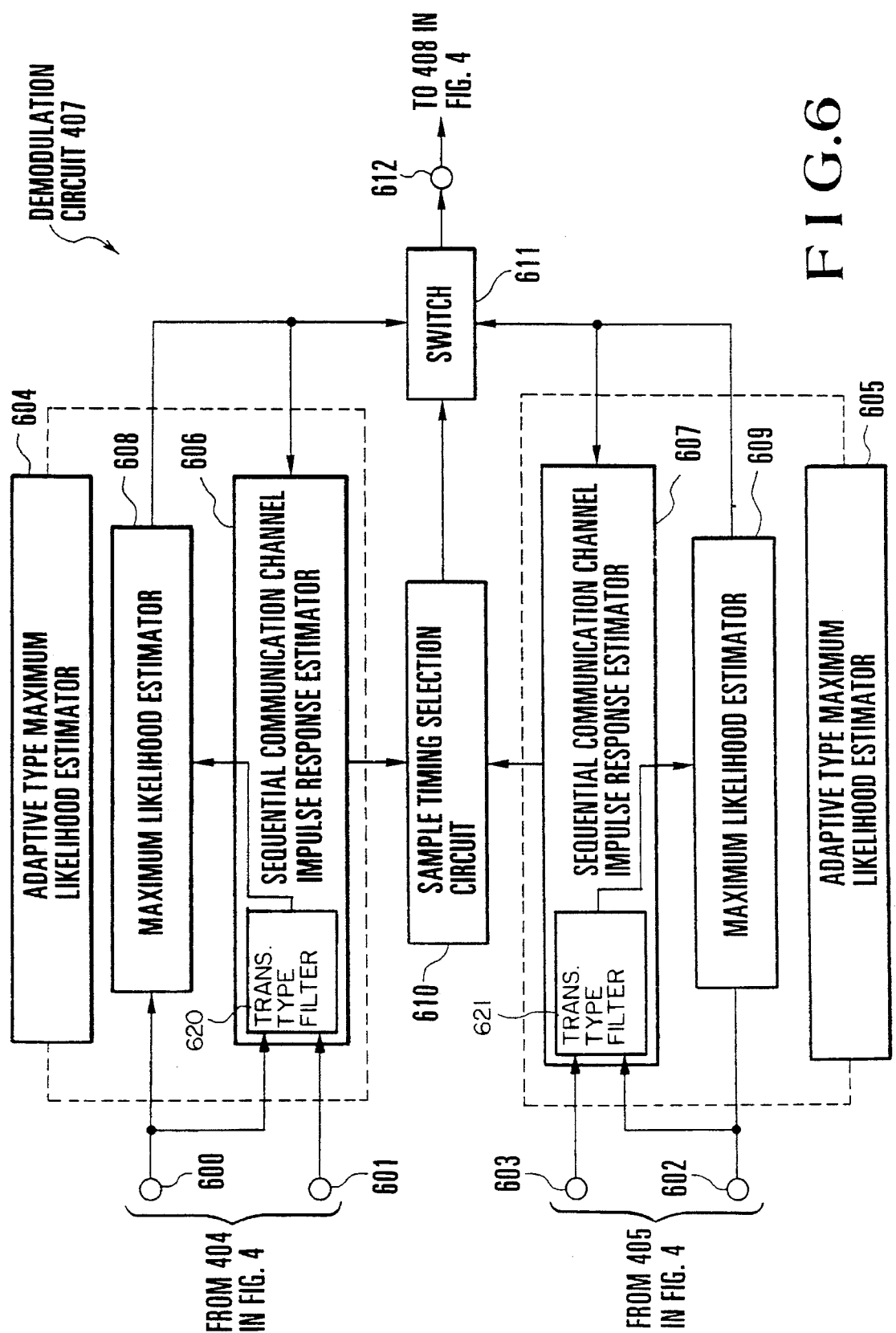
FIG. 6 is a block diagram showing a demodulation circuit in the second embodiment.
Figure 7:
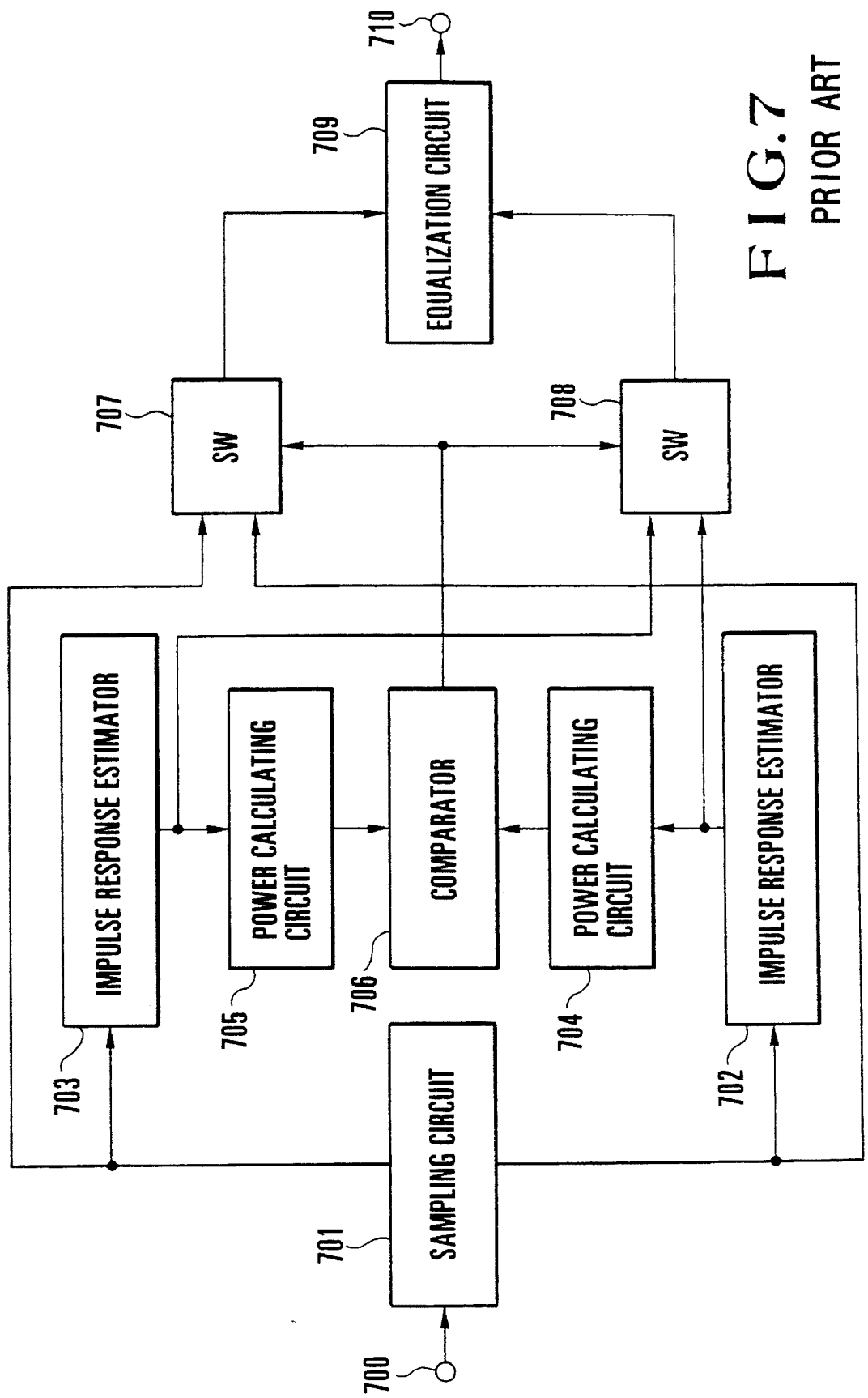
FIG. 7 is a block diagram showing a conventional digital data demodulating apparatus.

FIG. 4 shows the second embodiment of the present invention. FIG. 5 shows a channel state data output circuit in the second embodiment. FIG. 6 shows a demodulation circuit in the second embodiment.

Referring to FIG. 4, a digital data demodulating apparatus of the second embodiment comprises a sampling circuit 401, N (=2) channel state data output circuits 402 and 403, a received signal sequence selection controller 406, a first switch 404, a second switch 405, and a demodulation circuit 407.

The sampling circuit 401 samples a received signal at a speed N×K (N=2; K=2) times a symbol rate, classifies combinations of sequences having symbol intervals sampled at K (=2) different sampling timings into N (=2) combinations, and outputs received signal sequences sampled at the same speeds as 2×2 symbol speeds.

The channel state data output circuits 402 and 403 receive a plurality of received signal sequences, of the plurality of received signal sequences output from the sampling circuit 401, which are sampled at K (=2) different timings, and estimate channel impulse responses from the respective received signal sequences, thus outputting the estimated channel impulse response values, respectively. In addition, the circuits 402 and 403 output channel state data on the basis of the K (= 2) estimated channel impulse response values.

The received signal sequence selection controller 406 receives the channel state data respectively output from the channel state data output circuits 402 and 403, and outputs switch control signals on the basis of the channel state data.

The first switch 404 receives the received signal sequences sampled at the same speeds as the 2×2 symbol speeds and output from the sampling circuit 401, and selects and outputs K (=2) received signal sequences to be demodulated from the received signal sequences, sampled at the same speeds as the 2×2 symbol speeds, on the basis of the switch control signals.

The second switch 405 receives the two estimated channel impulse response values respectively output from the channel state data output circuits 402 and 403 and the switch control signals from the received signal sequence selection controller 406, and selects and outputs estimated channel impulse response values, estimated from the two received signal sequences to be demodulated, from the two estimated channel impulse response values respectively output from the N (=2) channel state data output circuits 402 and 403, on the basis of the switch control signal.

The demodulation circuit 407 performs demodulation upon receiving the signals from the first and second switches 404 and 405.

The sampling circuit 401 has an arrangement like the one shown in FIG. 2 as in the first embodiment.

Referring to FIG. 5, each of the channel state data output circuits 402 and 403 comprises two channel impulse response estimators 502 and 503, two power calculating circuits 504 and 505, and a divider 506.

The channel impulse response estimators 502 and 503 estimate channel impulse responses from received signal sequences sampled, with a phase $\phi$, at the symbol rate intervals, and received signal sequences sampled, with a phase $\phi+\pi$, at the symbol rate intervals, and output the estimated channel impulse response values, respectively.

The power calculating circuits 504 and 505 respectively receive the two estimated channel impulse response values, and calculate the powers of the channel impulse responses.

The divider 506 receives the outputs from the two power calculating circuits 504 and 505, calculates the ratio between the input signals, and outputs the resultant value as channel state data.

Referring to FIG. 6, the demodulation circuit 407 is constituted by adaptive type maximum likelihood sequence estimators 604 and 605, sequential channel impulse response estimators 606 and 607, maximum likelihood estimators 608 and 609, a sample timing selection circuit 610, and a switch 611. For example, each of the adaptive type maximum likelihood sequence estimators 604 and 605 may be realized by using the maximum likelihood estimator disclosed in J. G. Proakis, "Digital Communications", McGraw-Hill, 1983, pp. 394–412. Each estimator is constituted by a sequential channel impulse response estimator and a maximum likelihood estimator.

The operation of the second embodiment will be described next with reference to FIGS. 4, 5, and 6.

A received signal input through an input terminal 400 is input to the sampling circuit 401 and is sampled with four difference sample phases. For example, the sampling circuit 401 may be arranged as shown in FIG. 2. The received signal sequences sampled with the different sample phases, which are obtained from the sampling circuit 401, are input to the channel state data output circuits 402 and 403 and the first switch 404.

In the channel state data output circuits 402 and 403 shown in FIG. 5, the signals input through input terminals 500 and 501 are respectively input to the channel impulse response estimators 502 and 503. If a preamble sequence having an autocorrelation function in an impulse state is used, each of the channel impulse response estimators 502 and 503 can be constituted by a circuit for calculating the correlation between a received signal and a preamble sequence, as described in, e.g., U.S. Pat. No. 5,127,025.

The estimated channel impulse response values respectively estimated by the channel impulse response estimators 502 and 503 are supplied to the power calculating circuits 504 and 505 and output terminals 509 and 508. The power calculating circuits 504 and 505 calculate the powers of the estimated channel impulse response values and output the obtained powers to the divider 506. The divider 506 calculates A/B where A is a larger one of the values input from the power calculating circuits 504 and 505, and B is the smaller value. The divider 506 outputs the calculated value as channel state data to an output terminal 509. In this case, the value B is a residual inter-symbol interference component with respect to the value A. Therefore, the larger the value of the channel state data is, the smaller the residual inter-symbol interference component is.

The channel state data respectively obtained by the channel state data output circuits 402 and 403 are input to the received signal sequence selection controller 406. The pairs of the estimated channel impulse response values from the channel state data output circuits 402 and 403 are output to the second switch 405.

In the second embodiment, larger channel state data indicates smaller residual inter-symbol interference. Therefore, the received signal sequence selection controller 406 outputs switch control signals to the first and second switches 404 and 405 to cause them to output a pair of received signal sequences and a pair of estimated channel impulse response values which correspond to one of the channel state data, respectively obtained from the channel state data output circuits 402 and 403, which has a larger value.

The demodulation circuit 407 modulates the signal by using the pair of received signal sequences and the pair of estimated channel impulse response values input from the first and second switches 404 and 405, and outputs the demodulation result to an output terminal 408.

In the demodulation circuit 407 shown in FIG. 6, a received signal sequence and an estimated channel impulse response value estimated from the received signal sequence are respectively input to input terminals 600 and 601. In addition, a received signal sequence, sampled at a sample timing different from that of the received signal sequence input to the input terminal 600, and an estimated channel impulse response value estimated from this received signal sequence are respectively input to input terminals 602 and 603.

The received signal sequences input to the input terminals 600 and 602 are input to the maximum likelihood estimators 608 and 609 to be demodulated. The demodulation results are then output to the sequential channel impulse response estimators 606 and 607 and the switch 611.

The estimated channel impulse response values input to the input terminals 601 and 603 are respectively input, as initial values, to the sequential channel impulse response estimators 606 and 607. The sequential channel impulse response estimators 606 and 607 respectively receive the modulation result and the received signal sequences, obtain received signal replicas by re-modulating the demodulation results through transversal type filters, (220 and 221) and sequentially update the tap coefficients of the transversal type filters so as to reduce error signals based on the actual received signal sequences and the received signal replicas, as indicated by, e.g., the above-mentioned J. G. Proakis, "Digital Communications", McGraw-Hill, 1983.

In this case, the tap coefficients of the transversal type filters are output, as estimated channel impulse response values, to the maximum likelihood estimators 608 and 609. The sequential channel impulse response estimators 606 and 607 output the error signals based on the actual received signal sequences and the received signal replicas to the sample timing selection circuit 610. The sample timing selection circuit 610 detect error signal powers from the sequential channel impulse response estimators 606 and 607, and controls the switch 611 to output, to an output terminal 612, the demodulation result from the adaptive type maximum likelihood sequence estimator corresponding to a smaller one of the error signal powers.

In the second embodiment, as the demodulation circuit 407, the circuit having the arrangement shown in FIG. 6 is used. However, a modulation circuit designed to receive a plurality of samples per symbol may be used, as disclosed in Okanoue, Ushirokawa, and Furuya, "A Fractionally Spaced MLSE Receiver Improving Degradation Caused by Sampling Phase Offset", THE INSTITUTE OF ELECTRONICS, INFORMATION AND COMMUNICATION ENGINEERS, Radio Communication System Research Meeting Report, RCS92-33, Jun. 26, 1992.

Figure 8:
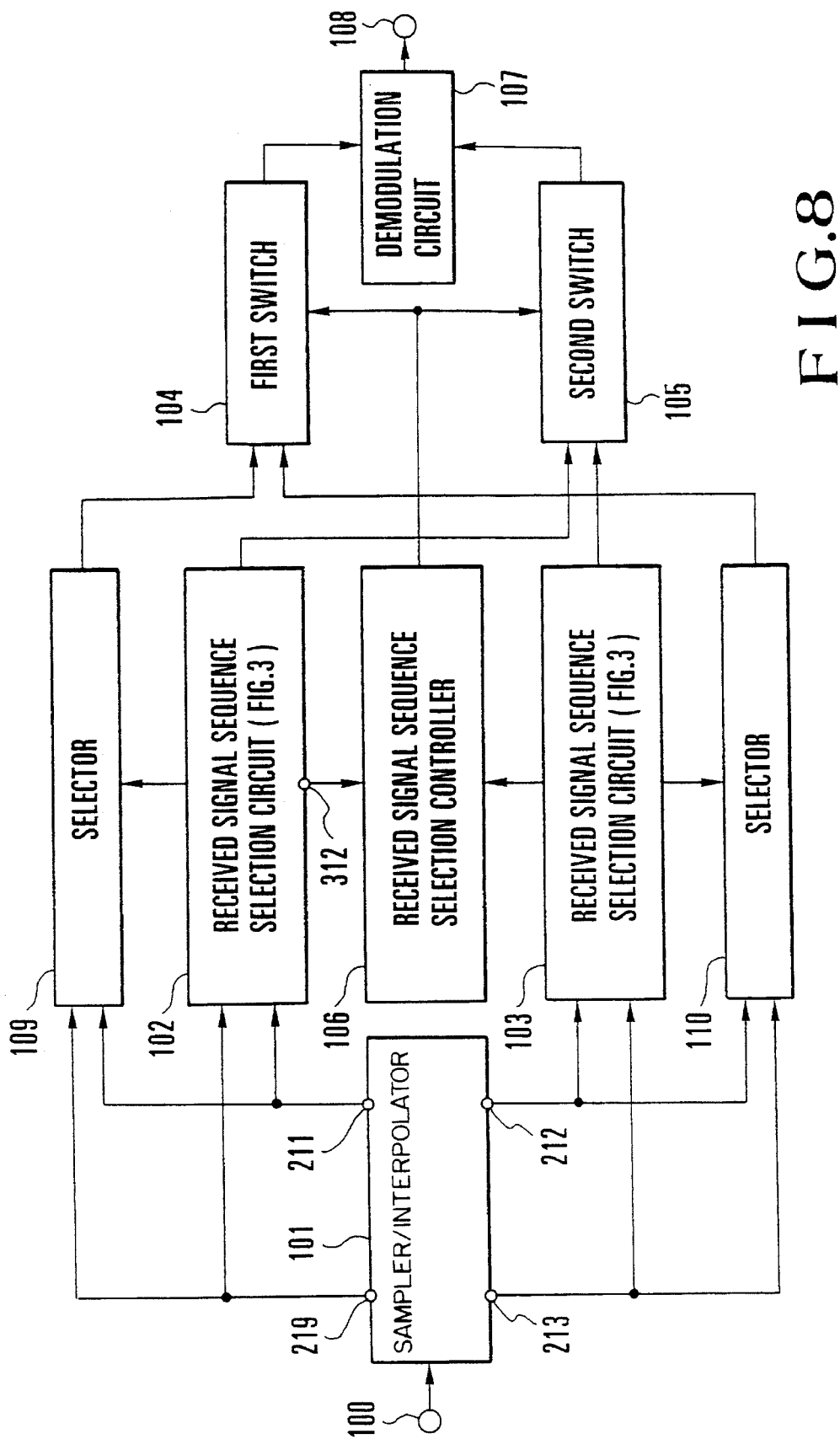
FIG. 8 is a block diagram showing an interpolator inserted in the demodulation circuit according to the present invention.
Figure 9:
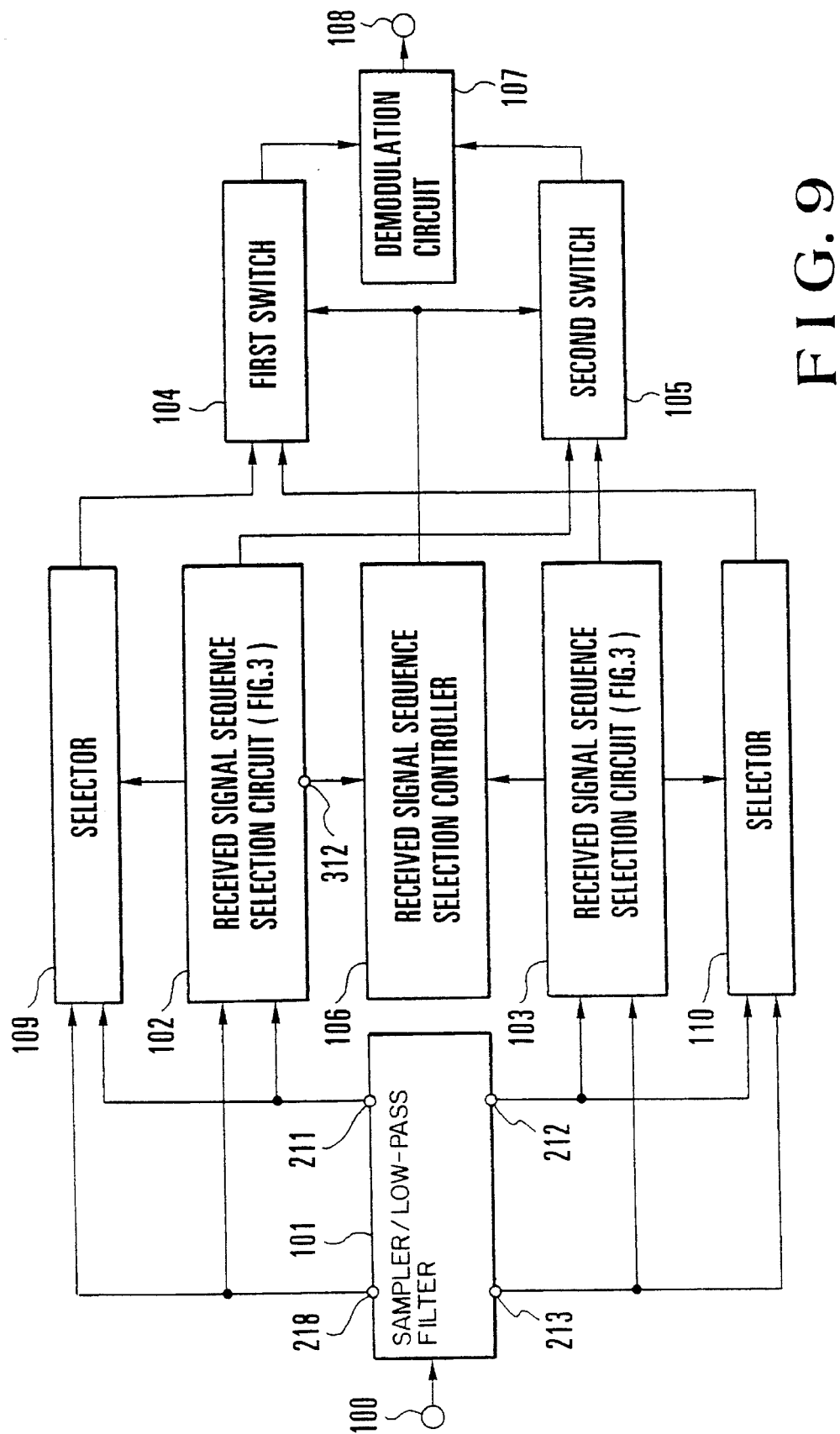
FIG. 9 is a block diagram showing a low pass filter inserted in the demodulation circuit according to the present invention.

Note that received signal sequences with different sampling phases can also be obtained by performing interpolation (219, FIG. 8) or filtering by means of a low-pass filter (218, FIG. 9) with respect to a received signal sequence sampled with a given phase.

In addition, the present invention can be realized by using a general-purpose processor.

In the first and second embodiments, the present invention is applied to the case wherein N=2 and K=2. It is, however, obvious that the present invention can be effectively applied to cases wherein N and K take other values.

The digital data demodulating apparatus of the present invention is made in consideration of not only the powers of estimated channel impulse response values estimated from received signal sequences sampled at different timings but also the power ratio between the estimated channel impulse response values obtained from the respective received signal sequences. For this reason, careful consideration can be given to residual inter-symbol interference as well as the powers of estimated channel impulse response values. Therefore, a received signal sequence sampled at a sample timing which allows a reduction in residual inter-symbol interference can be selected.

More specifically, according to the first aspect of the present invention, a received signal is sampled at a speed N×K times the symbol speed, and the sampled sequences are classified into N combinations, each constituted by sequences of symbol speed rates sampled at K different timings. The inter-symbol interference amount of each of the N combinations is estimated from the sequences of the symbol speed intervals sampled at the K different timings, which belong to each of the N combinations, and one of the combinations which has the minimum inter-symbol interference amount is selected. Furthermore, a sequence having the maximum signal power is selected from the K sequences belonging to the selected combination. The selected sequence is then demodulated. With this operation, a received signal sequence sampled at a sample timing at which the inter-symbol interference is minimum and the received signal power is maximum can be demodulated, thereby restricting a deterioration in reception characteristics caused by a sample timing offset.

According to the second aspect of the present invention, a received signal is sampled at a speed N×K times the symbol speed, and the sampled sequences are classified into N combinations, each constituted by sequences of symbol speed rates sampled at K different timings. The inter-symbol interference amount of each of the N combinations is estimated from the sequences of the symbol speed intervals sampled at the K different timings, which belong to each of the N combinations, and one of the combinations which has the minimum inter-symbol interference amount is selected. In the demodulation circuit, demodulation is performed on the basis of the K sequences belonging to the selected combination. With this operation, demodulation can be performed on the basis of the K sequences sampled at sample timings at which the inter-symbol interference is minimum, thereby restricting a deterioration in reception characteristics caused by a sample timing offset.

According the first and second aspects of the present invention, a sampling circuit can be constituted by an oscillator of one symbol interval. In addition, according to the first aspect of the present invention, when K=2, a high-precision estimated inter-symbol interference amount and a larger one of received signal powers with respect to two sequences can be output as communication channel data. According to the second aspect of the present invention, when K=2, an inter-symbol interference amount can be accurately estimated and output as communication channel data.

What is claimed is:

1. A digital data demodulating apparatus comprising:

a sampling circuit for sampling a received signal at a speed N×K (N>1, K>1; even natural numbers) times a symbol rate, classifying combinations of received signal sequences having symbol intervals sampled at K different sample timings into N combinations, and outputting said received signal sequences sampled at the speed of N×K times the symbol rate;

N received signal sequence selection circuits each for receiving selected respective received signal sequences, of a plurality of received signal sequences output from said sampling circuit, which are sampled at the K different timings, estimating channel impulse responses from the respective received signal sequences, obtaining and outputting channel state data corresponding to the respective estimated channel impulse response values, and outputting a control pulse for controlling selection among the respective received signal sequences for demodulation, on the basis of the respective estimated channel impulse response values and the estimated channel impulse response values estimated from the respective received signal sequences;

a received signal sequence selection controller for receiving the channel state data respectively output from said N received signal sequence selection circuits, and outputting a switch control signal for selecting a received signal sequence to be demodulated on the basis of the channel state data;

N selectors for receiving the control pulse and the plurality of received signal sequences sampled at the K different timings, selecting demodulation received signal sequence candidates from the plurality of received signal sequences, sampled at the K different timings, on the basis of the control pulse, and outputting the selected candidates;

a first switch for receiving the outputs from said N selectors and the switch control pulse, and selecting and outputting a received signal sequence to be demodulated from the outputs from said N selectors on the basis of the switch control pulse;

a second switch for receiving the switch control pulse and the estimated channel impulse response values from said N received signal sequence selection circuits and selecting and outputting an estimated channel impulse response value estimated from the received signal sequence to be demodulated; and, a demodulation circuit for performing demodulation upon reception of the outputs from said first and second switches.

2. An apparatus according to claim 1, wherein said sampling circuit includes:

an oscillation circuit for generating a clock pulse having the same speed as the symbol rate;

N first phase shifter circuits for receiving the clock pulse and outputting N first sample pulses having different phases by changing the phase of the clock pulse;

N second phase shifter circuits for respectively shifting the phases of the outputs from said first phase shifter circuits by $\pi$ to output N second sample pulses;

N first sampler circuits for receiving the first sample pulses and sampling the received signal at the respective timings of the N first sample pulses; and N second sampler circuits for receiving the second sample pulses and sampling the received signal at the respective timings of the N second sample pulses.

3. An apparatus according to claim 1, wherein K=2, and each of said received signal sequence selection circuits includes:

two channel impulse response estimators for respectively estimating channel impulse response from received signal sequences sampled, with a phase $\phi$, at symbol rate intervals, and received signal sequences sampled, with a phase $\phi+\pi$, at the symbol rate intervals, and outputting the respective estimated channel impulse response values;

two power calculating circuits for receiving the two estimated channel impulse response values, and calculating powers of the channel impulse responses;

a comparator for receiving the outputs from said two power calculating circuits and selecting a maximum input value to output the control pulse;

a dividing circuit for receiving the outputs from said two power calculating circuits to obtain a ratio of said outputs from said two power calculating circuits, and outputting the ratio as the channel state data; and a switch for receiving the two estimated channel impulse response values, and selecting and outputting an input signal on the basis of the control pulse.

4. An apparatus according to claim 1, wherein said demodulation circuit receives a plurality of samples per symbol.

5. An apparatus according to claim 1, wherein N=K= 2.

6. A digital data demodulating apparatus comprising:

a sampling circuit for sampling a received signal at a speed N×K (N>1, K>1; even natural numbers) times a symbol rate, classifying combinations of received signal sequences having symbol intervals sampled at K different sample timings into N combinations, and outputting said received signal sequences sampled at the speed of N×K times the symbol rate;

N channel state data output circuits each for receiving selected respective received signal sequences, of the plurality of received signal sequences output from said sampling circuit, which are sampled at the K different timings, estimating channel impulse responses from the respective received signal sequences, outputting the estimated channel impulse response values, respectively, and outputting channel state data corresponding to the K estimated channel impulse response values;

a received signal sequence selection controller for receiving the channel state data respectively output from said N channel state data output circuits, and outputting a switch control signal on the basis of the channel state data;

a first switch for receiving the received signal sequences sampled at N×K times the symbol rate and output from said sampling circuit, and selecting and outputting K received signal sequences to be demodulated from the received signal sequences on the basis of the switch control signal;

a second switch for receiving the switch control signal and the K estimated channel impulse response values respectively output from said N channel state data output circuits, and selecting and outputting estimated channel impulse response values corresponding to the K received signal sequences to be demodulated, on the basis of the switch control signal; and, a demodulation circuit for performing demodulation upon receiving the signals from the first and second switches.

7. An apparatus according to claim 6, wherein said sampling circuit includes:

an oscillation circuit for generating a clock pulse having the same speed as the symbol rate;

N first phase shifter circuits for receiving the clock pulse and outputting N first sample pulses having different phases by changing the phase of the clock pulse;

N second phase shifter circuits for respectively shifting the phases of the outputs from said first phase shifter circuits by $\pi$ to output N second sample pulses;

N first sampler circuits for receiving the first sample pulses and sampling the received signal at the respective timings of the N first sample pulses; and N second sampler circuits for receiving the second sample pulses and sampling the received signal at the respective timings of the N second sample pulses.

8. An apparatus according to claim 6, wherein K=2, and each of said channel state data output circuits includes two channel impulse response estimators for estimating channel impulse responses from received signal sequences sampled, with a phase $\phi$, at symbol rate intervals, and received signal sequences sampled, with a phase $\phi+\pi$, at the symbol rate intervals, and outputting the estimated channel impulse response values, respectively;

two power calculating circuits for respectively receiving the two estimated channel impulse response values, and calculating powers of the channel impulse responses; and a dividing circuit for receiving the outputs from said two power calculating circuits, calculating a ratio of said outputs from said two power calculating circuits, and outputting the ratio as the channel state data.

9. An apparatus according to claim 6, wherein said demodulation circuit receives a plurality of samples per symbol.

10. An apparatus according to claim 6, wherein N=K=2.

11. A digital data demodulating apparatus, comprising:

a sampling circuit for sampling a received signal at a speed N×K (N>1, K>1; even natural numbers) times a symbol rate, classifying combinations of received signal sequences having symbol intervals sampled at K different sample timings into N combinations, and outputting said received signal sequences sampled at the speed of N×K times the symbol rate;

N received signal sequence selection circuits each for receiving selected respective received signal sequences, of a plurality of received signal sequences output from said sampling circuit, which are sampled at the K different timings, estimating channel impulse responses from the respective received signal sequences, obtaining and outputting channel state data corresponding to the respective estimated channel impulse response values, and outputting a control pulse for controlling selection among the respective received signal sequences for demodulation, on the basis of the respective estimated channel impulse response values and the estimated channel impulse response values estimated from the respective received signal sequences;

a received signal sequence selection controller for receiving the channel state data respectively output from said N received signal sequence selection circuits, and outputting a switch control signal for selecting a received signal sequence to be demodulated on the basis of the channel state data;

N selectors for receiving the control pulse and the plurality of received signal sequences sampled at the K different timings, selecting demodulation received signal sequence candidates from the plurality of received signal sequences, sampled at the K different timings, on the basis of the control pulse, and outputting the selected candidates;

a first switch for receiving the outputs from said N selectors and the switch control pulse, and selecting and outputting a received signal sequence to be demodulated from the outputs from said N selectors on the basis of the switch control pulse;

a second switch for receiving the switch control pulse and the estimated channel impulse response values from said N received signal sequence selection circuits and selecting and outputting an estimated channel impulse response value estimated from the received signal sequence to be demodulated;

a demodulation circuit for performing demodulation upon reception of the outputs from said first and second switches;

wherein said sampling circuit comprises at least one sampler for sampling the received signal and an interpolator receiving an output of said at least one sampler for interpolating the received signal sampled by said at least one sampler to thereby provide said sampling at the speed of N×K times the symbol rate.

12. A digital data demodulating apparatus comprising:

a sampling circuit for sampling a received signal at a speed N×K (N>1, K>1; even natural numbers) times a symbol rate, classifying combinations of received signal sequences having symbol intervals sampled at K different sample timings into N combinations, and outputting said received signal sequences sampled at the speed of N×K times the symbol rate;

N channel state data output circuits each for receiving selected respective received signal sequences, of the plurality of received signal sequences output from said sampling circuit, which are sampled at the K different timings, estimating channel impulse responses from the respective received signal sequences, outputting the estimated channel impulse response values, respectively, and outputting channel state data corresponding to the K estimated channel impulse response values;

a received signal sequence selection controller for receiving the channel state data respectively output from said N channel state data output circuits, and outputting a switch control signal on the basis of the channel state data;

a first switch for receiving the received signal sequences sampled at N×K times the symbol rate and output from said sampling circuit, and selecting and outputting K received signal sequences to be demodulated from the received signal sequences on the basis of the switch control signal;

a second switch for receiving the switch control signal and the K estimated channel impulse response values respectively output from said N channel state data output circuits, and selecting and outputting estimated channel impulse response values corresponding to the K received signal sequences to be demodulated, on the basis of the switch control signal; and, a demodulation circuit for performing demodulation upon receiving the signals from the first and second switches;

wherein said sampling circuit comprises at least one sampler for sampling the received signal and an interpolator receiving an output of said at least one sampler for interpolation the received signal sequence sampled by said at least one sampler to thereby provide said sampling at the speed of N×K times the symbol rate.

13. A digital data demodulating apparatus, comprising:

a sampling circuit for sampling a received signal at a speed N×K (N>1, K>1; even natural numbers) times a symbol rate, classifying combinations of received signal sequences having symbol intervals sampled at K different sample timings into N combinations, and outputting said received signal sequences sampled at the speed of N×K times the symbol rate;

N received signal sequence selection circuits each for receiving selected respective received signal sequences, of a plurality of received signal sequences output from said sampling circuit, which are sampled at the K different timings, estimating channel impulse responses from the respective received signal sequences, obtaining and outputting channel state data corresponding to the respective estimated channel impulse response values, and outputting a control pulse for controlling selection among the respective received signal sequences for demodulation, on the basis of the respective estimated channel impulse response values and the estimated channel impulse response values estimated from the respective received signal sequences;

a received signal sequence selection controller for receiving the channel state data respectively output from said N received signal sequence selection circuits, and outputting a switch control signal for selecting a received signal sequence to be demodulated on the basis of the channel state data;

N selectors for receiving the control pulse and the plurality of received signal sequences sampled at the K different timings, selecting demodulation received signal sequence candidates from the plurality of received signal sequences, sampled at the K different timings, on the basis of the control pulse, and outputting the selected candidates;

a first switch for receiving the outputs from said N selectors and the switch control pulse, and selecting and outputting a received signal sequence to be demodulated from the outputs from said N selectors on the basis of the switch control pulse;

a second switch for receiving the switch control pulse and the estimated channel impulse response values from said N received signal sequence selection circuits and selecting and outputting an estimated channel impulse response value estimated from the received signal sequence to be demodulated;

a demodulation circuit for performing demodulation upon reception of the outputs from said first and second switches;

wherein said sampling circuit comprises at least one sampler for sampling the received signal and a low-pass filter receiving an output of said at least one sampler for filtering the received signal sequence sampled by said at least one sampler to thereby provide said sampling at the speed of N×K times the symbol rate.

14. A digital data demodulating apparatus comprising:

a sampling circuit for sampling a received signal at a speed N×K (N>1, K>1; even natural numbers) times a symbol rate, classifying combinations of received signal sequences having symbol intervals sampled at K different sample timings into N combinations, and outputting said received signal sequences sampled at the speed of N×K times the symbol rate;

N channel state data output circuits each for receiving selected respective received signal sequences, of the plurality of received signal sequences output from said sampling circuit, which are sampled at the K different timings, estimating channel impulse responses from the respective received signal sequences, outputting the estimated channel impulse response values, respectively, and outputting channel state data corresponding to the K estimated channel impulse response values;

a received signal sequence selection controller for receiving the channel state data respectively output from said N channel state data output circuits, and outputting a switch control signal on the basis of the channel state data;

a first switch for receiving the received signal sequences sampled at N×K times the symbol rate and output from said sampling circuit, and selecting and outputting K received signal sequences to be demodulated from the received signal sequences on the basis of the switch control signal;

a second switch for receiving the switch control signal and the K estimated channel impulse response values respectively output from said N channel state data output circuits, and selecting and outputting estimated channel impulse response values corresponding to the K received signal sequences to be demodulated, on the basis of the switch control signal; and, a demodulation circuit for performing demodulation upon receiving the signals from the first and second switches;

wherein said sampling circuit comprises at least one sampler for sampling the received signal and a low-pass filter receiving an output of said at least one sampler for filtering the received signal sequence sampled by said at least one sampler to thereby provide said sampling at the speed of N×K times the symbol rate.

* * * * *